United States Patent
Mizunaka et al.

(10) Patent No.: US 11,137,588 B2
(45) Date of Patent: Oct. 5, 2021

(54) OBSERVATION APPARATUS WHICH ILLUMINATES AND OBSERVES A SPECIMEN FROM BELOW

(71) Applicant: OLYMPUS CORPORATION, Hachioji (JP)

(72) Inventors: Masaru Mizunaka, Tokyo (JP); Shintaro Takahashi, Tokyo (JP); Akira Matsushita, Tokyo (JP); Yohei Tanikawa, Tokyo (JP); Tsuyoshi Mochizuki, Tokyo (JP); Shinichi Takimoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 293 days.

(21) Appl. No.: 16/364,946

(22) Filed: Mar. 26, 2019

(65) Prior Publication Data

US 2019/0219810 A1    Jul. 18, 2019

Related U.S. Application Data

(63) Continuation of application No. PCT/JP2017/033820, filed on Sep. 20, 2017.

(30) Foreign Application Priority Data

Sep. 30, 2016   (JP) .............................. JP2016-194281

(51) Int. Cl.
*G02B 21/06*     (2006.01)
*G02B 21/16*     (2006.01)
(Continued)

(52) U.S. Cl.
CPC ............. *G02B 21/16* (2013.01); *G01N 21/17* (2013.01); *G01N 21/64* (2013.01);
(Continued)

(58) Field of Classification Search
CPC ........ G02B 21/16; G02B 21/02; G02B 21/06; G02B 21/10; G02B 21/12; G02B 21/125;
(Continued)

(56) References Cited

U.S. PATENT DOCUMENTS 4,969,037 A * 11/1990 Poleschinski .......... G01B 11/00
                                                         250/223 B
5,038,258 A    8/1991 Koch et al.
(Continued)

FOREIGN PATENT DOCUMENTS

EP     1553166 A1    7/2005
EP     1615061 A1    1/2006
(Continued)

OTHER PUBLICATIONS

U.S. Appl. No. 15/690,024, filed Aug. 29, 2017, First Named Inventor: Tadashi Hirata, Title: "Observation Apparatus".
(Continued)

*Primary Examiner* — Arnel C Lavarias
(74) *Attorney, Agent, or Firm* — Holtz, Holtz & Volek PC (57) ABSTRACT

An observation apparatus including: a light-source that emits illumination light and excitation light upward from below a specimen; and an image-capturing optical system having an objective lens that focuses, below the specimen, transmitted light, which is the illumination light that is emitted from the light-source, that is reflected above the specimen, and that has passed through the specimen, and fluorescence that is generated in the specimen that has been irradiated with the excitation light emitted from the light-source, wherein the light-source is disposed radially outside the objective lens.

18 Claims, 10 Drawing Sheets

(51) Int. Cl.

| | |
|---|---|
| *G02B 21/02* | (2006.01) |
| *G02B 21/12* | (2006.01) |
| *G01N 21/64* | (2006.01) |
| *G02B 21/36* | (2006.01) |
| *G02B 21/10* | (2006.01) |
| *G01N 21/17* | (2006.01) |
| *G02B 21/24* | (2006.01) |
| *G02B 21/33* | (2006.01) |

(52) U.S. Cl.
CPC ......... *G01N 21/6458* (2013.01); *G02B 21/02* (2013.01); *G02B 21/06* (2013.01); *G02B 21/10* (2013.01); *G02B 21/12* (2013.01); *G02B 21/125* (2013.01); *G02B 21/24* (2013.01); *G02B 21/36* (2013.01); *G02B 21/367* (2013.01); *G01N 2021/6478* (2013.01); *G02B 21/33* (2013.01)

(58) Field of Classification Search
CPC ...... G02B 21/24; G02B 21/36; G02B 21/367; G02B 21/33; G02B 21/00; G02B 21/0004; G02B 21/0032; G02B 21/08; G02B 21/082; G02B 21/084; G02B 21/086; G02B 21/088; G02B 21/361; G01N 21/17; G01N 21/64; G01N 21/6458; G01N 2021/6478
USPC ....... 359/385, 362, 363, 368, 369, 387, 388, 359/390; 356/416, 407
See application file for complete search history.

(56) References Cited

U.S. PATENT DOCUMENTS

| | | | |
|---|---|---|---|
| 5,751,475 | A | 5/1998 | Ishiwata et al. |
| 6,025,956 | A | 2/2000 | Nagano et al. |
| 6,643,061 | B2 | 11/2003 | Osa et al. |
| 8,699,128 | B2 | 4/2014 | Yamashita et al. |
| 8,873,027 | B2 | 10/2014 | Sugiyama et al. |
| 9,766,445 | B2 | 9/2017 | Kei et al. |
| 2001/0028497 | A1 | 10/2001 | Uhl |
| 2004/0113043 | A1 | 6/2004 | Ishikawa et al. |
| 2005/0105172 | A1 | 5/2005 | Hasegawa et al. |
| 2006/0072190 | A1 | 4/2006 | Okugawa |
| 2007/0177255 | A1 | 8/2007 | Kanegasaki et al. |
| 2008/0201083 | A1 | 8/2008 | Hata et al. |
| 2009/0051901 | A1 | 2/2009 | Shen et al. |
| 2010/0208053 | A1 | 8/2010 | Hasegawa et al. |
| 2011/0089339 | A1 | 4/2011 | Yamashita et al. |
| 2013/0130307 | A1 | 5/2013 | Sugiyama et al. |
| 2013/0156287 | A1 | 6/2013 | Houjou et al. |
| 2013/0229707 | A1 | 9/2013 | Sakaguchi |
| 2014/0333997 | A1 | 11/2014 | Oda |
| 2014/0340476 | A1 | 11/2014 | Sun et al. |
| 2015/0253561 | A1 | 9/2015 | Lee et al. |
| 2015/0264235 | A1 | 9/2015 | Houjou et al. |
| 2016/0048011 | A1 | 2/2016 | Suzuki et al. |
| 2016/0249810 | A1* | 9/2016 | Darty ................... A61B 5/0075 600/477 |
| 2017/0261732 | A1 | 9/2017 | Takahashi et al. |
| 2017/0355949 | A1 | 12/2017 | Hirata et al. |
| 2018/0252648 | A1* | 9/2018 | Dohi ............... G01N 21/6458 |
| 2018/0267285 | A1 | 9/2018 | Hirata et al. |
| 2018/0329193 | A1 | 11/2018 | Hirata et al. |
| 2019/0219808 | A1* | 7/2019 | Takahashi ............... G02B 21/26 |
| 2020/0088985 | A1 | 3/2020 | Hirata |
| 2020/0318058 | A1* | 10/2020 | Mochizuki ............. C12M 31/02 |

FOREIGN PATENT DOCUMENTS

| | | |
|---|---|---|
| EP | 2312367 A1 | 4/2011 |
| EP | 2562245 A1 | 2/2013 |
| EP | 2955502 A1 | 12/2015 |
| EP | 3211469 A1 | 8/2017 |
| JP | 57178212 A | 11/1982 |
| JP | H02232614 A | 9/1990 |
| JP | H02272412 A | 11/1990 |
| JP | H07261089 A | 10/1995 |
| JP | H09179034 A | 7/1997 |
| JP | 2001166219 A | 6/2001 |
| JP | 2003021628 A | 1/2003 |
| JP | 2004070276 A | 3/2004 |
| JP | 2004318185 A | 11/2004 |
| JP | 2004348104 A | 12/2004 |
| JP | 2004361485 A | 12/2004 |
| JP | 2005010258 A | 1/2005 |
| JP | 3684106 B2 * | 8/2005 |
| JP | 2005326495 A | 11/2005 |
| JP | 2005331623 A | 12/2005 |
| JP | 2006030583 A | 2/2006 |
| JP | 2006174764 A | 7/2006 |
| JP | 2006179387 A | 7/2006 |
| JP | 2007264410 A | 10/2007 |
| JP | 2007323094 A | 12/2007 |
| JP | 2008092882 A | 4/2008 |
| JP | 2008209726 A | 9/2008 |
| JP | 2009217222 A | 9/2009 |
| JP | 2011008188 A | 1/2011 |
| JP | 2011102970 A | 5/2011 |
| JP | 2011141444 A | 7/2011 |
| JP | 2013238797 A | 11/2013 |
| JP | 2015084059 A | 4/2015 |
| JP | 2016000007 A | 1/2016 |
| JP | 6066110 B2 | 1/2017 |
| JP | 2018072845 A | 5/2018 |
| KR | 100813915 B1 | 3/2008 |
| WO | 2006101056 A1 | 9/2006 |
| WO | 2011132586 A1 | 10/2011 |
| WO | 2012029817 A1 | 3/2012 |
| WO | 2013047315 A1 | 4/2013 |
| WO | 2013157606 A1 | 10/2013 |
| WO | 2014038871 A1 | 3/2014 |
| WO | 2014041820 A1 | 3/2014 |
| WO | 2016158780 A1 | 10/2016 |

OTHER PUBLICATIONS

Chinese Office Action (and English language translation thereof) dated Dec. 27, 2019 issued in a related Ohinese Application No. 201580085163.7.

Japanese Office Action (and English language translation thereof) dated Feb. 9, 2021 issued in Japanese Application No. 2019-521536.

International Search Report (ISR) (and English translation thereof) dated Aug. 29, 2017 issued in International Application No. PCT/JP2017/019895.

International Search Report (ISR) (and English translation thereof) dated Mar. 8, 2016 issued in International Application No. PCT/JP2015/084805.

Related U.S. Appl. No. 16/003,402; First Named Inventor: Tadashi Hirata; Title: "Observation Device"; filed Jun. 8, 2018.

Related U.S. Appl. No. 16/689,671; First Named Inventor: Tadashi Hirata; Title: "Observation Device"; filed Nov. 20, 2019.

Written Opinion (and English language translation thereof) dated Aug. 29, 2017 issued in International Application No. PCT/JP2017/019895.

Written Opinion (and English language translation thereof) dated Mar. 8, 2016 issued in International Application No. PCT/JP2015/084805.

Office Action (Non-Final Rejection) dated May 18, 2020 issued in related U.S. Appl. No. 16/003,402.

Japanese Office Action dated Dec. 3, 2019 (and English translation thereof) issued in Japanese Patent Application No. 2017-225493.

Office Action (Non-Final Rejection) dated Apr. 6, 2020 issued in related U.S. Appl. No. 15/984,949.

Ford T. N., et al., "Phase-gradient microscopy in thick tissue with oblique back-illumination," Nature Methods, vol. 3, No. 12, Dec. 2012, pp. 1195-1197.

(56) References Cited

OTHER PUBLICATIONS

International Search Report (ISR) dated Dec. 19, 2017 issued in International Application No. PCT/JP2017/033820.
Lugmaier R. A., et al., "Phase contrast and DIC illumination for AFM hybrids," Ultramicroscopy, vol. 104, No. 3-4, 2005, pp. 255-260.
U.S. Appl. No. 15/607,666, filed May 29, 2017, First Named Inventor: Shintaro Takahashi, Title: "Observation Apparatus and Observation Method to Observe a Sample With Reflected Light Transmitted Through the Sample".
U.S. Appl. No. 15/984,949, filed May 21, 2018, First Named Inventor: Tadashi Hirata, Title: "Observation Device".
Webb K. F., "Condenser-free contrast methods for transmitted-light microscopy," Journal of Microscopy, vol. 257, Issue 1, 2015, pp. 8-22.
Written Opinion dated Dec. 19, 2017 issued in International Application No. PCT/JP2017/033820.

* cited by examiner

OBSERVATION APPARATUS WHICH ILLUMINATES AND OBSERVES A SPECIMEN FROM BELOW

CROSS-REFERENCE TO RELATED APPLICATIONS

This is a continuation of International Application PCT/JP2017/033820, with an international filing date of Sep. 20, 2017, which is hereby incorporated by reference herein in its entirety.

This application is based on Japanese Patent Application No. 2016-194281, the contents of which are incorporated herein by reference.

TECHNICAL FIELD

The present invention relates to an observation apparatus.

BACKGROUND ART

In the related art, as an apparatus for observing the shape of an imaging subject such as a fluorescent-labeled cell, there is a known observation apparatus employing phase-difference observation or differential-interference observation (for example, see Patent Literature 1).

CITATION LIST

Patent Literature

{PTL 1} Japanese Unexamined Patent Application, Publication No. 2006-30583

SUMMARY OF INVENTION

An aspect of the present invention provides an observation apparatus including: a light-source that emits illumination light and excitation light upward from below a specimen; and an image-capturing optical system having an objective lens that focuses, below the specimen, transmitted light, which is the illumination light that is emitted from the light-source, that is reflected above the specimen, and that has passed through the specimen, and fluorescence that is generated in the specimen that has been irradiated with the excitation light emitted from the light-source, wherein the light-source is disposed radially outside the objective lens.

Another aspect of the present invention provides an observation apparatus including: an illumination light-source that emits illumination light upward from below a specimen; an excitation light-source that emits excitation light toward the specimen; and an image-capturing optical system that captures, below the specimen, transmitted light, which is the illumination light that is emitted from the illumination light-source, that is reflected above the specimen, and that has passed through the specimen, and fluorescence that is generated in the specimen that has been irradiated with the excitation light emitted from the excitation light-source.

Another aspect of the present invention provides an observation method including: emitting illumination light upward from below a specimen; reflecting, above the specimen, the emitted illumination light; causing the reflected illumination light to pass through the specimen; capturing, below the specimen, transmitted light, which is the illumination light that has passed through the specimen; emitting excitation light toward the specimen; and capturing fluorescence generated in the specimen by means of the emitted excitation light.

DESCRIPTION OF EMBODIMENTS

An observation apparatus 1 according to an embodiment of the present invention will be described below with reference to the drawings.

Figure 1:
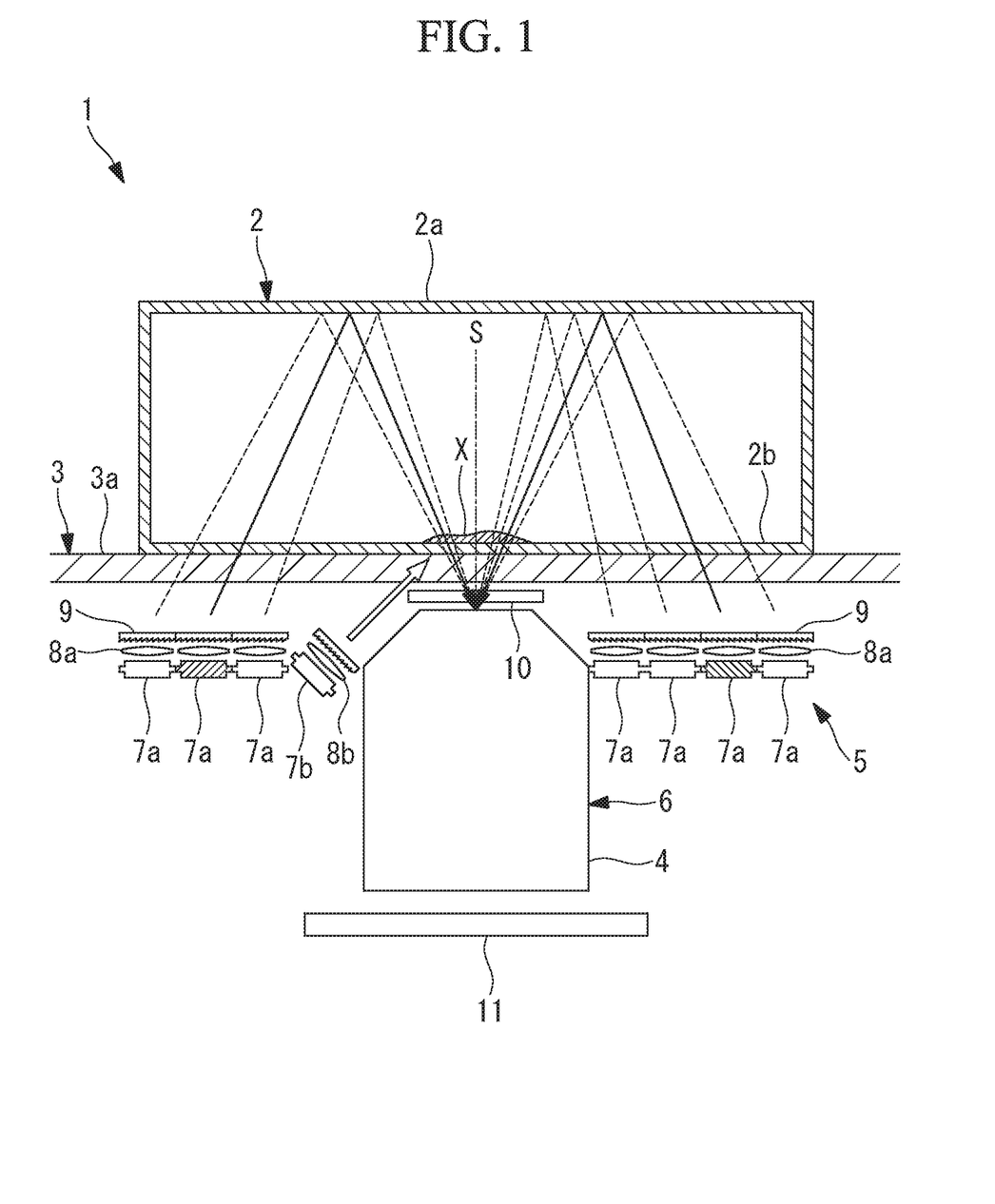
FIG. 1 is a partial longitudinal cross-sectional view showing an observation apparatus according to an embodiment of the present invention.

As shown in FIG. 1, the observation apparatus 1 according to this embodiment is provided with: a stage 3 on which a container 2 accommodating a specimen X is placed; an objective lens 4 that is disposed below the stage 3 and that focuses light that comes thereinto; an image-capturing optical system 6 that captures an image of the light focused by the objective lens 4; and a light-source portion 5 that is disposed radially outside the objective lens 4 and that emits illumination light and excitation light upward passing through the stage 3.

At the stage 3, an optically transparent material, for example, a glass plate 3a, is disposed so as to cover the portions above the objective lens 4 and the light-source portion 5, and the container 2 is configured so as to be placed on an upper surface of the glass plate 3a.

The container 2 is, for example, a cell-culturing flask having a top plate 2a, and is entirely formed of an optically transparent resin.

Figure 2:
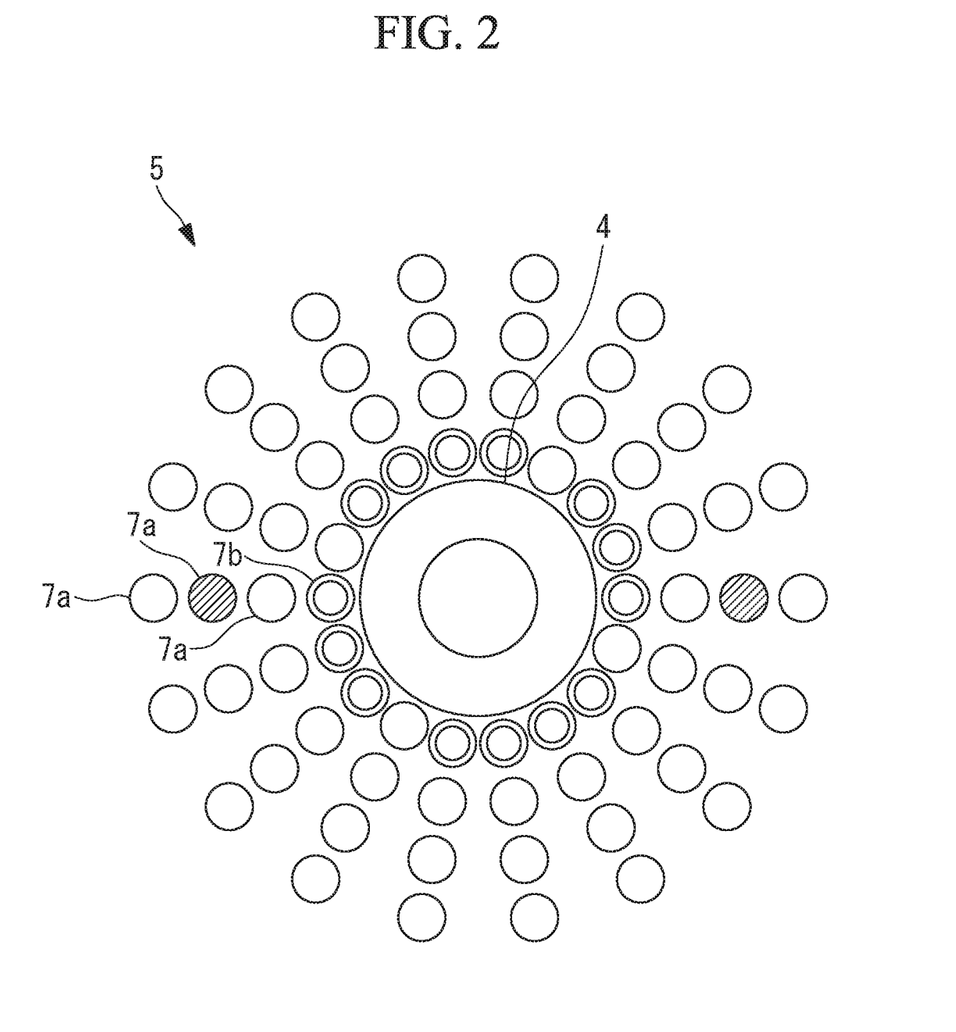
FIG. 2 is a plan view showing an example of placement of LED light sources in a light-source portion of the observation apparatus in FIG. 1.

As shown in FIGS. 1 and 2, the light-source portion 5 is provided with: a plurality of LED light sources (light sources) 7a and 7b that are disposed in the area surrounding the objective lens 4 with spacings therebetween in a circumferential direction and a radial direction; a plurality of collimating lenses (optical devices) 8a that are disposed in correspondence with the individual LED light sources 7a and that convert the illumination light generated at the individual LED light sources 7a to substantially parallel light; a plurality of focusing lenses (optical devices) 8b that are disposed in correspondence with the individual LED light sources 7b and that focus excitation light; and diffusion plates 9 that diffuse the illumination light collimated by the collimating lenses 8a and the excitation light focused by the focusing lenses 8b.

In addition, a member in which the diffusion plates 9 of the LED light sources 7a and the collimating lenses 8a, which convert the illumination light to the substantially parallel light, are integrated (for example, a Fresnel lens or the like) may be employed.

The LED light sources (illumination light-source portions) 7a generate the illumination light, and the LED light sources (excitation light-source portions) 7b generate the excitation light.

The light-source portion 5 is configured so that it is possible to independently or simultaneously turn on the specific LED light sources 7a and 7b (FIGS. 1 and 2 indicate, with hatching, the illumination-light LED light sources 7a that are turned on).

In other words, by turning on only the illumination-light LED light sources 7a at different positions in the radial direction of the objective lens 4, as shown in FIG. 1 with the solid lines, it is possible to change, as indicated by the broken lines, the angles at which the illumination light enters the objective lens 4, by being reflected by an inner surface of the top plate 2a of the container 2 after passing through the glass plate 3a and a bottom surface 2b of the container 2 upward from therebelow, and by passing through the specimen X, the bottom surface 2b of the container 2, and glass plate 3a from diagonally thereabove.

In addition, by turning on only the illumination-light LED light sources 7a at specific positions in the circumferential directions of the objective lens 4, it is possible to illuminate the specimen X form the specific directions in the circumferential directions. In addition, as shown in FIG. 2, by turning on the illumination-light LED light sources 7a that are disposed in two or more directions in the circumferential direction of the objective lens 4, in particular directions that are axially symmetrical with respect to an optical axis S of the objective lens 4, it is possible to irradiate the specimen X with illumination light in which illumination irregularity is reduced.

In addition, the excitation-light LED light sources 7b are arrayed, for example, as indicated by double circles in FIG. 2, along a circumferential direction at positions closest to the objective lens 4. By increasing the number of excitation-light LED light sources 7b as compared with the illumination-light LED light sources 7a that are disposed at the same radial-direction positions, the intensity of the excitation light is increased, and thus, the light level of the fluorescence is increased.

The LED light sources 7b, the focusing lenses 8b, and the diffusion plates 9 are installed in an inwardly inclined manner as compared with the illumination-light LED light sources 7a and so forth so that the excitation light emitted from these excitation-light LED light sources 7b almost entirely passes through the glass plate 3a and the bottom surface 2b of the container 2 from below, and directly irradiates the specimen X that is disposed on the bottom surface 2b and that is in a viewing-field area of the objective lens 4. Part of the excitation light passes through the bottom surface 2b, as with the illumination light, is reflected by the top plate 2a of the container 2, and irradiates the specimen X from thereabove, thus generating a fluorescence in the specimen X.

The illumination-light LED light sources 7a and the excitation-light LED light sources 7b emit illumination light and the excitation light that have different wavelengths.

The image-capturing optical system 6 is provided with: a barrier filter 10 that is disposed between the glass plate 3a and the objective lens 4; and an image-acquisition device 11 that captures the transmitted light of the illumination light or the fluorescence focused by the objective lens 4.

The barrier filter 10 possesses wavelength characteristics that allow the illumination light emitted from the illumination-light LED light sources 7a and the fluorescence generated in the specimen X to pass therethrough, and that block the excitation light emitted from the excitation-light LED light sources 7b.

The operation of the observation apparatus 1, thus configured, will be described below.

In order to observe the shape and a fluorescence image of a transparent specimen X, such as a cell, by using the observation apparatus 1 according to this embodiment, as shown in FIG. 1, the fluorescent-labeled specimen X is accommodated in the container 2 and, in a state in which the specimen X is attached to the bottom surface 2b, the container 2 is placed on the glass plate 3a of the stage 3 so that the bottom surface 2b faces down.

Then, in this state, any one of the LED light sources 7a and 7b of the light-source portion 5 is operated, and the illumination light or the excitation light is generated. In the case in which an illumination-light LED light source 7a is operated, the illumination light generated at the illumination-light LED light source 7a is converted to substantially parallel light by the collimating lens 8a that is disposed in correspondence with that LED light source 7a, passes through the glass plate 3a and the bottom surface 2b of the container 2 upward from therebelow in a state of being diffused by the diffusion plate 9 and having a high robustness without irregularities, and irradiates the specimen X from diagonally thereabove after being reflected by the inner surface of the top plate 2a of the container 2.

Of the illumination light irradiating the specimen X, the transmitted light of the illumination light that has passed through the specimen X passes through the bottom surface 2b of the container 2 and the glass plate 3a downward from thereabove, passes through the barrier filter 10, and enters the objective lens 4. At this time, the illumination light is refracted and scattered due to the shape and the refractive index of the specimen X or is dimmed due to the transmittance of the specimen X, is converted to transmitted light carrying the information about the specimen X, is focused by the objective lens 4, and is captured by the image-acquisition device 11.

On the other hand, in the case in which an excitation-light LED light source 7b is operated, the excitation light generated at the LED light source 7b is focused by the focusing lens 8b that is disposed in correspondence with the LED light source 7b, passes through the glass plate 3a and the bottom surface 2b of the container 2 upward from therebelow in a state of being diffused by the diffusion plate 9, and directly irradiates the specimen X that is attached to the bottom surface 2b of the container 2. Although the fluorescence generated in the specimen X as a result of being irradiated with the excitation light is emitted in all directions, of that fluorescence, a portion of the fluorescence that has passed through the bottom surface 2b and the glass plate 3a passes through the barrier filter 10, is focused by the objective lens 4, and is captured by the image-acquisition device 11. The excitation light that has been reflected by the specimen X, the bottom surface 2b, and the glass plate 3a is blocked by the barrier filter 10 so as not to pass therethrough downward.

As has been described above, with the observation apparatus 1 according to this embodiment, because the image-capturing optical system 6, which includes the light-source portion 5 and the objective lens 4, is disposed below the specimen X, there is an advantage in that it is possible to make the apparatus thin by placing the light-source portion 5 and the image-capturing optical system 6 together only on one side of the specimen X, as compared with a conventional transmitted-light observation apparatus in which a light-source portion and an image-capturing optical system are disposed on either side of the specimen. In addition, also in such a thin observation apparatus 1, there is an advantage in that it is possible to observe, by capturing the transmitted light, the shape of an imaging subject such as a cell and a fluorescence image of the imaging subject.

In addition, as a result of being emitted from radially outside the objective lens 4 and reflected by the inner surface of the top plate 2a of the container 2, the illumination light coming from the light-source portion 5 is radiated onto the specimen X from diagonally thereabove and is focused by the objective lens 4; therefore, it is possible to form contrast in an image of the specimen X by appropriately setting the entry angle with respect to the specimen X, and thus, there is an advantage in that it is possible to acquire an image that is easy to view even with a transparent imaging subject such as a cell.

In addition, in this embodiment, because the light-source portion 5 is arrayed in the area surrounding the objective lens 4 in the radial direction and is provided with the plurality of illumination-light LED light sources 7a that can independently be turned on, as indicated by the broken lines in FIG. 1, by changing the radial-direction positions of the illumination-light LED light sources 7a to be turned on, it is possible to change the radiation angles at which the illumination light enters the specimen X. By doing so, it is possible to use bright-field illumination in which illumination irregularity is low in the case in which the entry angle is smaller than the acceptance angle of the objective lens 4; in addition, it is possible to use dark-field illumination with which fine structures are emphasized in the case in which the entry angle is greater than the acceptance angle of the objective lens 4; and furthermore, it is possible to use oblique illumination with which the specimen X is three-dimensionally viewed in the case in which the entry angle is equivalent to the acceptance angle of the objective lens 4.

In addition, in this embodiment, because the light-source portion 5 is arrayed in the area surrounding the objective lens 4 in the circumferential direction and is provided with the plurality of illumination-light LED light sources 7a that can independently be turned on, by changing the circumferential-direction positions of the illumination-light LED light sources 7a to be turned on, it is possible to change the radiation directions in which the illumination light enters the specimen X. By doing so, it is possible to change the appearance by changing the direction of shadows in an image of the specimen X to be formed.

In addition, as shown in FIG. 2, by simultaneously turning on the plurality of illumination-light LED light sources 7a set at different circumferential-direction positions, in particular, by simultaneously turning on the plurality of illumination-light LED light sources 7a that are axi-symmetrically disposed, there is an advantage in that it is possible to acquire an image of the specimen X in which irregularity is low as a result of reducing the illumination irregularity.

In addition, in this embodiment, because the diffusion plates 9 are provided in correspondence with the individual LED light sources 7a, the illumination light emitted from the illumination-light LED light sources 7a is uniformly diffused, and it is possible to irradiate the specimen X with illumination light in which the illumination irregularity is low and that has uniform intensity.

In addition, with this embodiment, because the excitation-light LED light sources 7b, the focusing lenses 8b, and the diffusion plates 9 are inclined so that nearly all of the excitation light is emitted in the direction in which the specimen X is directly irradiated therewith, there is an advantage in that it is possible to observe a bright fluorescence image of the specimen X by irradiating the specimen X with the high-intensity excitation light.

Note that, in this embodiment, by inclining the excitation-light LED light sources 7b, the focusing lenses 8b, and the diffusion plates 9 inward, the generated excitation light is directed in the direction in which the specimen X is directly irradiated therewith; however, alternatively, the excitation light may be directed toward the specimen X by providing a deflection device such as a prism (not shown) without inclining the excitation-light LED light sources 7b and so forth.

Figure 3:
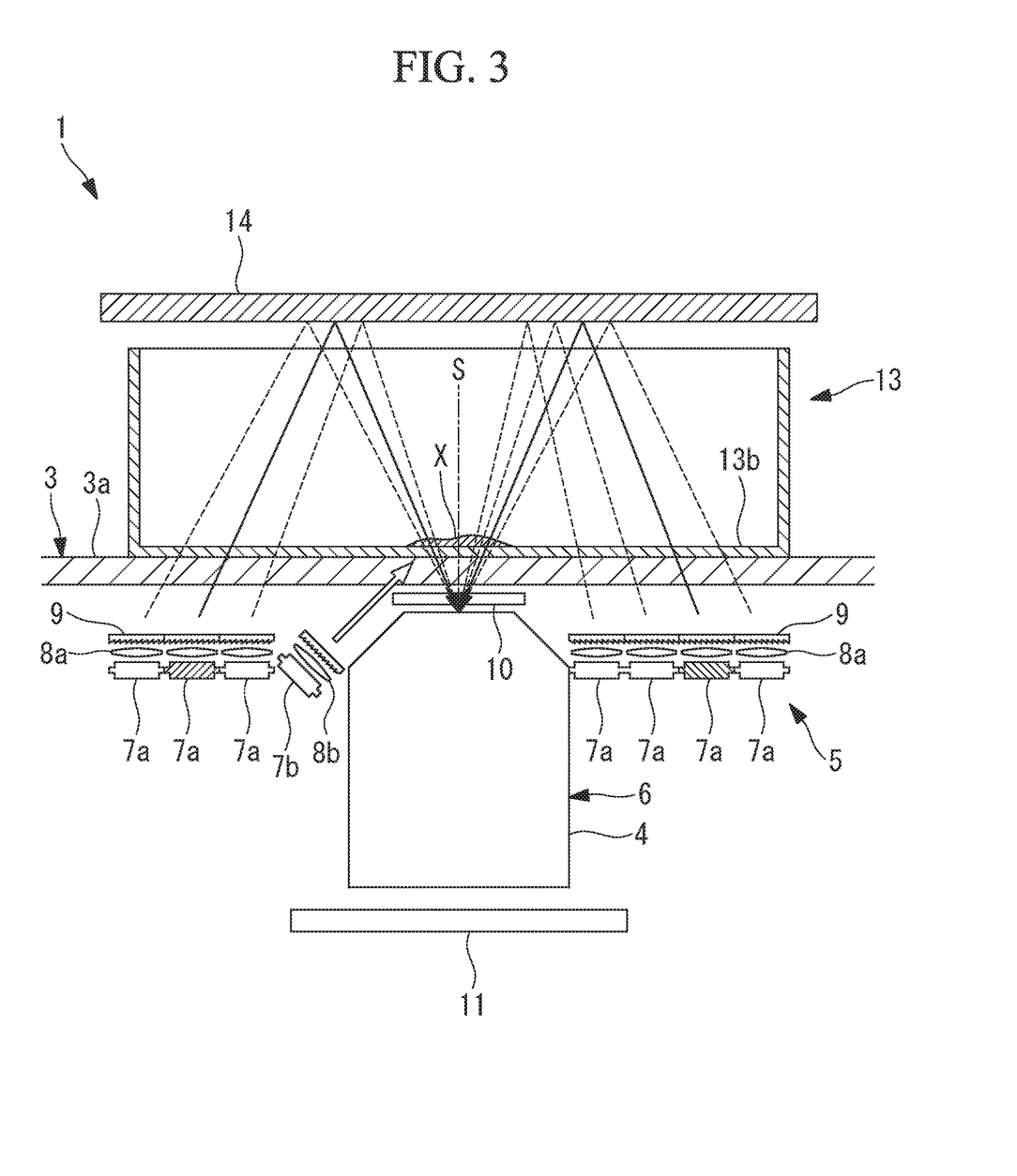
FIG. 3 is a partial longitudinal cross-sectional view showing a first modification of the observation apparatus in FIG. 1.

In addition, in this embodiment, the specimen X is accommodated in the container 2 having the top plate 2a, such as a cell-culturing flask, and the illumination light and/or the excitation light is reflected by the inner surface of the top plate 2a of the container 2; however, there is no limitation thereto. For example, as the container, in the case in which the specimen X is accommodated in a container 13 without a top plate, such as a petri dish (no lid), as shown in FIG. 3, a reflecting member 14 such as a mirror may be disposed at a position at which the top opening of the petri dish is closed off, and the illumination light and/or the excitation light that has passed through a bottom surface 13b upward from therebelow may be reflected by the reflecting member 14. The reflecting member 14 may be provided so as to be capable of being inserted into/retracted from the position above the specimen X by means of straight movement or pivoting. In this case, a retroreflecting member may be employed as the reflecting member 14. In addition, this reflecting member 14 also serves as a light-blocking member, and, because the reflecting member 14 blocks external light coming from the exterior, it is possible to efficiently perform observation by suppressing the external light from entering the container 13.

Figure 4:
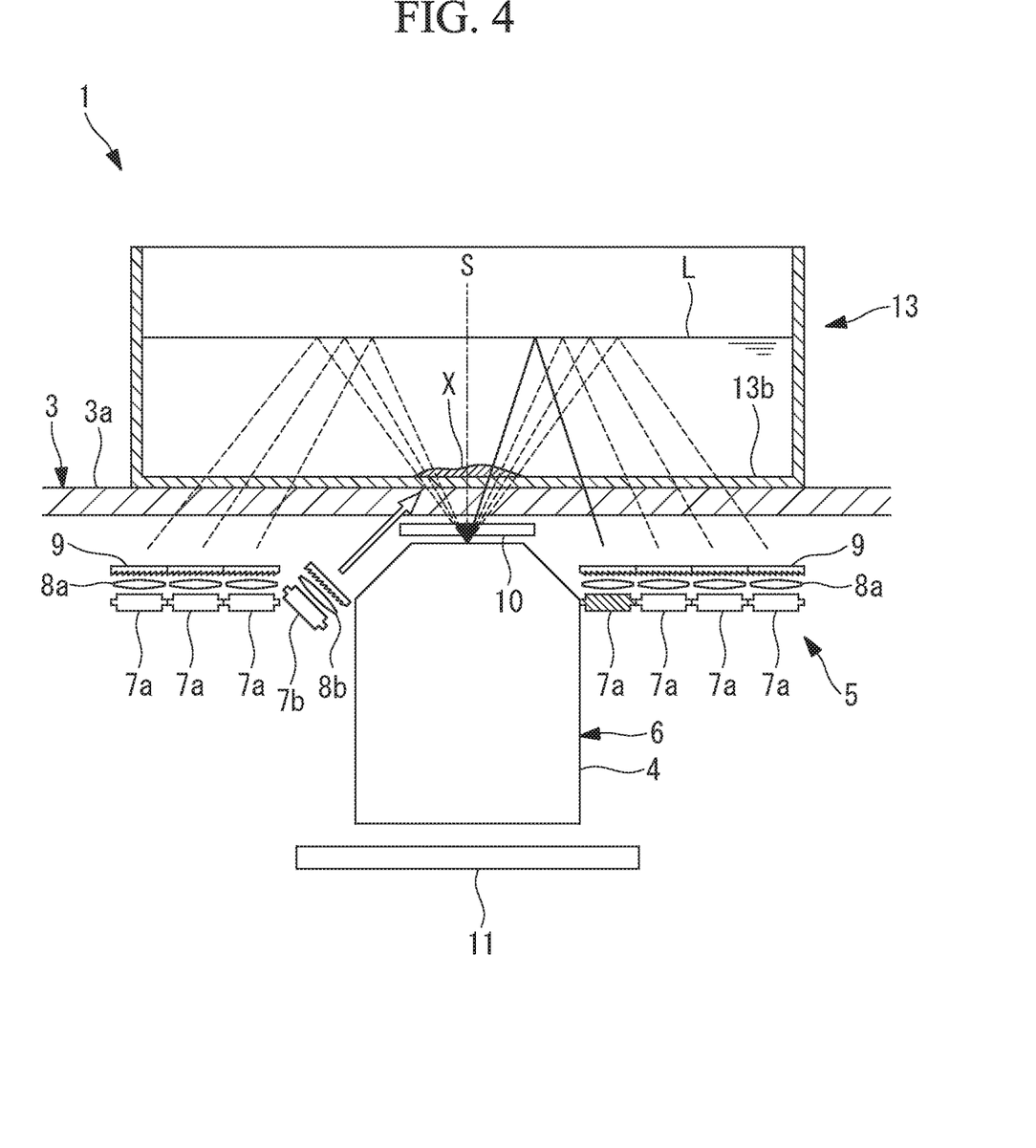
FIG. 4 is a partial longitudinal cross-sectional view showing a second modification of the observation apparatus in FIG. 1.

In addition, as a container, in the case in which the specimen X is accommodated in the container 13 without a top plate, such as a petri dish (no lid), as shown in FIG. 4, the container 13 may be filled with a solution (for example, a culturing medium, phosphate buffer, or the like) L, the specimen X may be immersed in the solution, and the illumination light that has passed through the bottom surface 13b upward from therebelow may be reflected by a liquid surface at the top of the solution. In the case in which the specimen X is accommodated in the container 2 having the top plate 2a also, the container 2 may be filled with the solution (for example, a culturing medium, phosphate buffer, or the like) L and the specimen X may be immersed in the solution.

Figure 5:
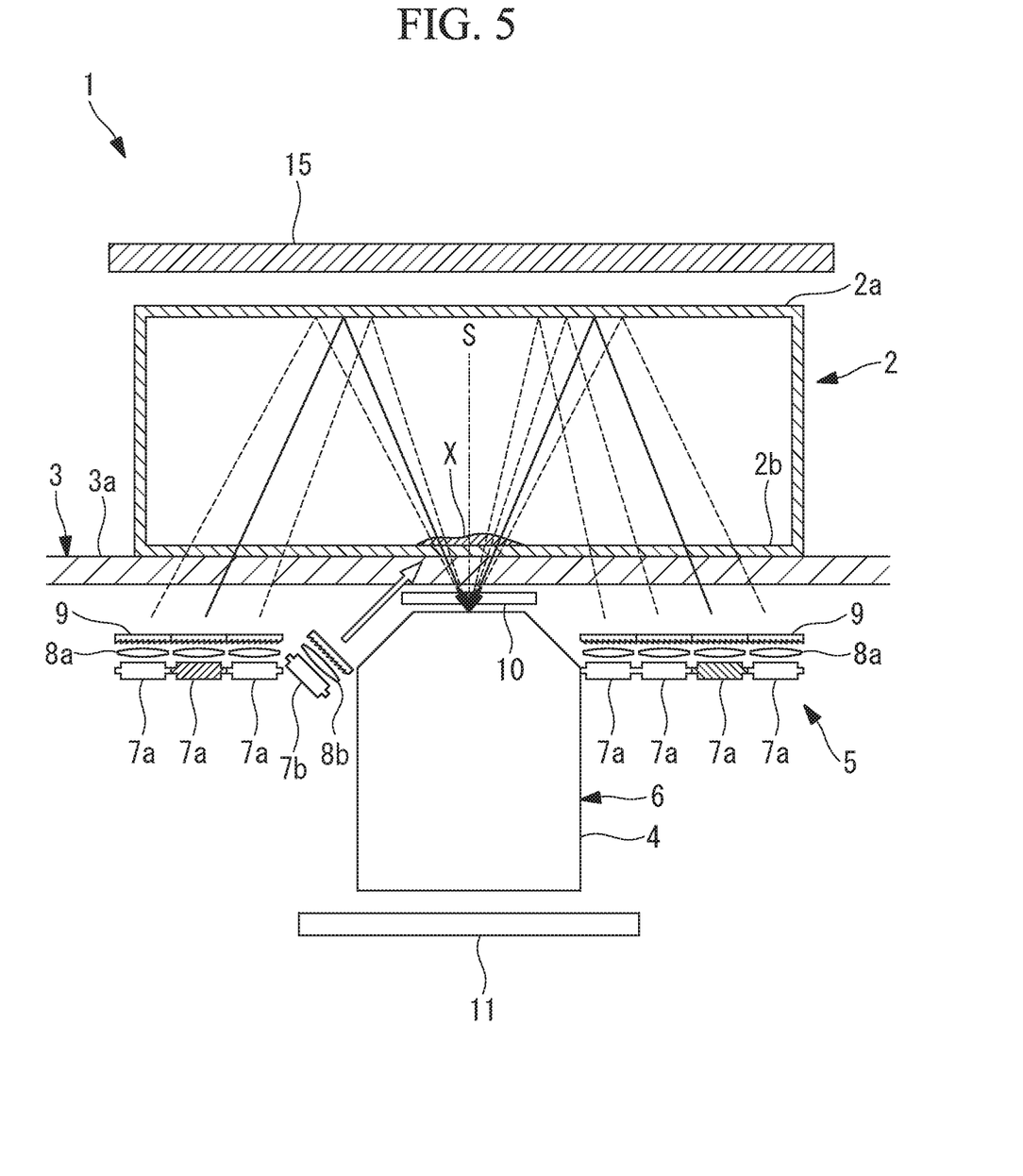
FIG. 5 is a partial longitudinal cross-sectional view showing a third modification of the observation apparatus in FIG. 1.

In addition, in this embodiment, as shown in FIG. 5, a light-blocking member 15 that is formed of a material that blocks light may be provided above the top plate 2a.

By doing so, because the external light coming from the exterior is blocked by the light-blocking member 15, it is possible to efficiently perform observation by suppressing the external light from entering the container 2 from the top plate 2a.

Figure 6:
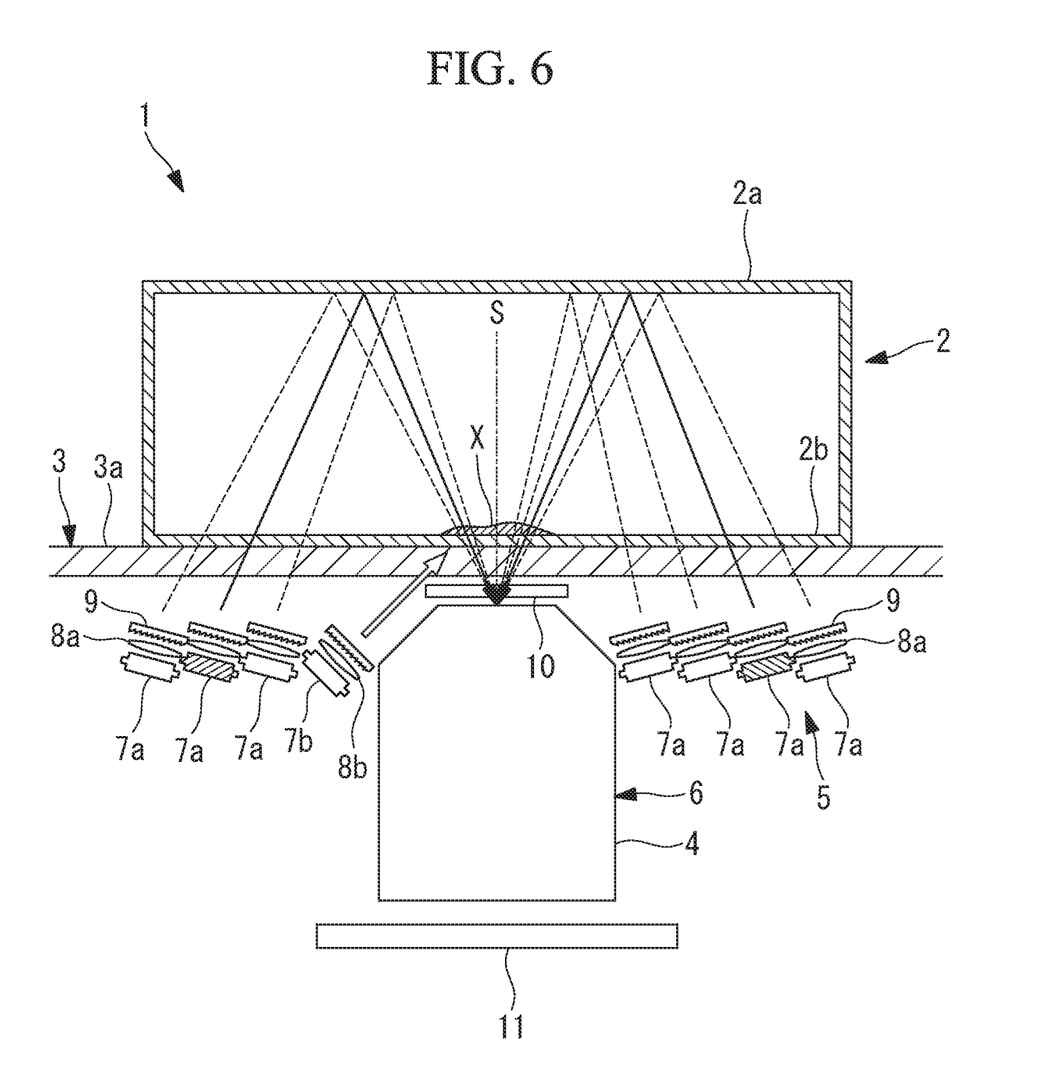
FIG. 6 is a partial longitudinal cross-sectional view showing a fourth modification of the observation apparatus in FIG. 1.

In addition, this embodiment has been described, regarding the light-source portion 5, in terms of an example in which the illumination-light LED light sources 7a, the collimating lenses 8a, and the diffusion plates 9 are substantially horizontally disposed along the glass plate 3a; however, alternatively, as shown in FIG. 6, the illumination-light LED light sources 7a, the collimating lenses 8a, and the diffusion plates 9 may also be disposed so as to be inclined toward the optical axis S.

By doing so, a loss of the illumination light emitted from the illumination-light LED light sources 7a is suppressed, and it is possible to efficiently irradiate the specimen X with the illumination light.

In addition, although this embodiment has been described, regarding the light-source portion 5, in terms of an example in which the collimating lenses 8a (or the focusing lenses 8b) and the diffusion plates 9 are provided, it is not necessary to provide the collimating lenses 8a (or the focusing lenses 8b) and the diffusion plates 9. In addition, the placements of the collimating lenses 8a (or the focusing lenses 8b) and the diffusion plates 9 may be inverted.

Figure 7:
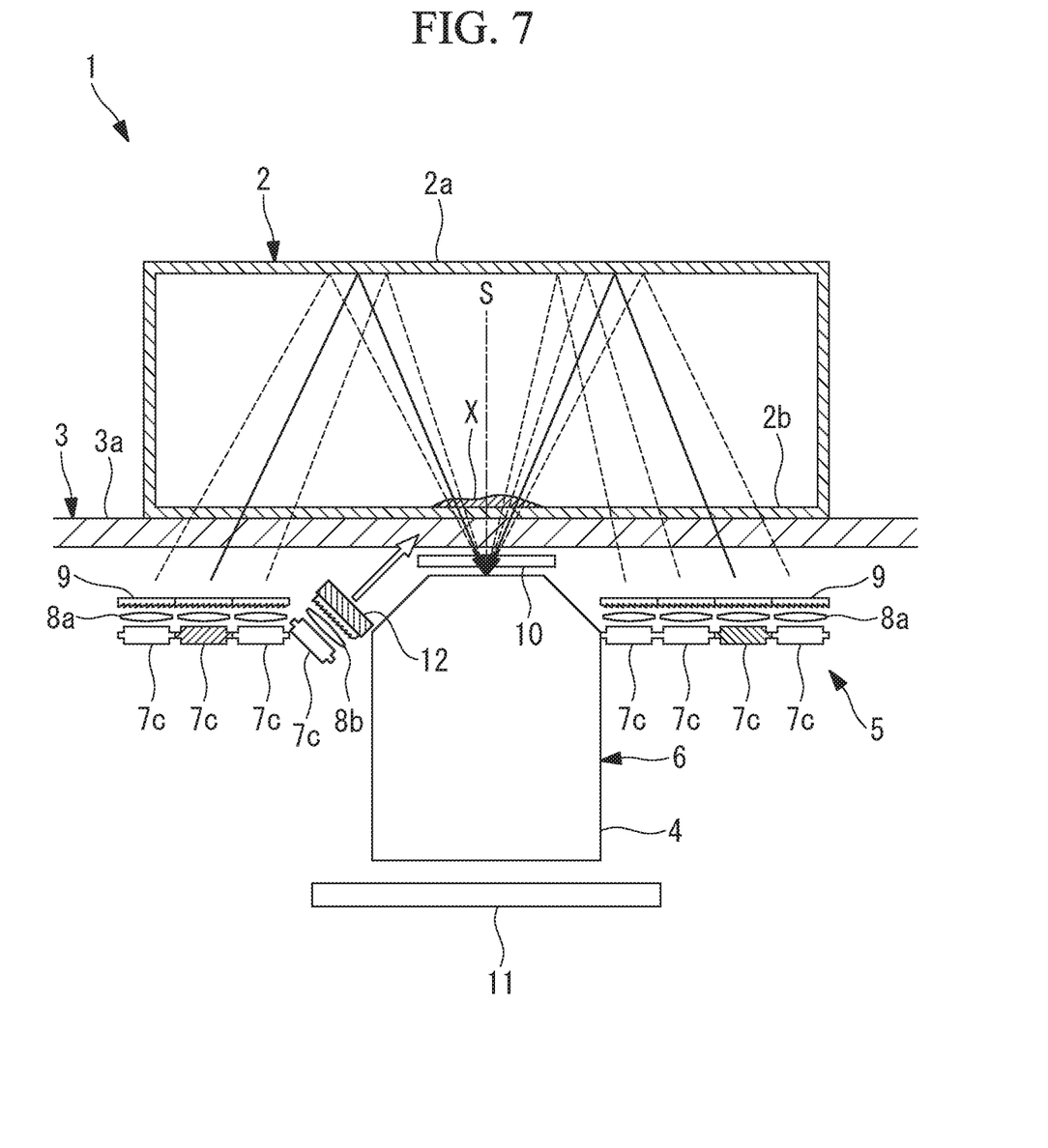
FIG. 7 is a partial longitudinal cross-sectional view showing a fifth modification of the observation apparatus in FIG. 1.

In addition, in this embodiment, the illumination-light LED light sources 7a and the excitation-light LED light sources 7b are assumed to emit the illumination light and the excitation light of different wavelengths; however, alternatively, shared LED light sources (light sources) 7c that emit broadband light may be employed, and, as shown in FIG. 7, the excitation-light LED light sources 7c may be provided with excitation filters 12 that cut out narrow-band excitation light from the light emitted from the LED light sources 7c.

Figure 8:
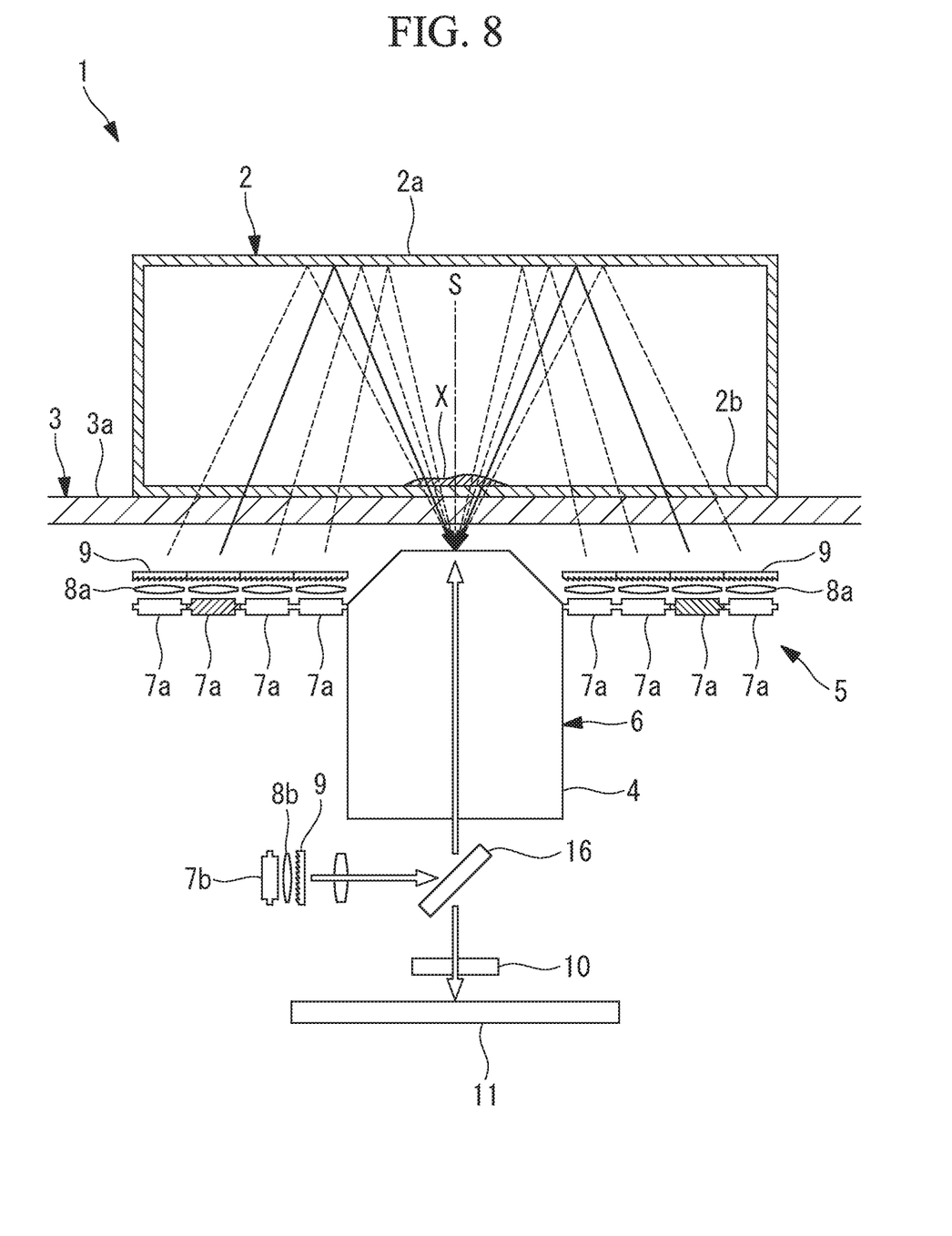
FIG. 8 is a partial longitudinal cross-sectional view showing a sixth modification of the observation apparatus in FIG. 1.

In addition, this embodiment has been described in terms of an example of the case in which the excitation light is emitted from the excitation-light LED light sources 7b that are arrayed radially outside the objective lens 4; however, alternatively, as shown in FIG. 8, the excitation light emitted from the excitation-light LED light sources 7b may be deflected by a dichroic mirror 16 and made to enter the objective lens 4 from below the objective lens 4, and the excitation light focused via the objective lens 4 may be radiated onto the specimen X from therebelow. By doing so, the fluorescence generated in the specimen X is focused by the objective lens 4, and a portion thereof that has passed through the dichroic mirror 16 and the barrier filter 10 is captured by the image-acquisition device 11.

By doing so, it is possible to observe a bright fluorescence image of the specimen X by irradiating, by using the objective lens 4, the specimen X with high-intensity excitation light by means of epi-illumination.

In addition, the excitation-light LED light sources 7b may be provided with excitation filters 12 that cut out the excitation light in a plurality of different wavelengths, and a plurality of barrier filters 10 that allow the fluorescences of different wavelengths to pass therethrough may be selectively inserted between the objective lens 4 and the glass plate 3a. By selectively turning on the excitation filters 12 possessing different wavelength characteristics, it is possible to change the wavelength of the excitation light to be radiated onto the specimen X. In addition, regarding the method for inserting and retracting the barrier filters 10, for example, a filter wheel may be employed. By doing so, it is possible to observe fluorescences at the plurality of different wavelengths.

Figure 9:
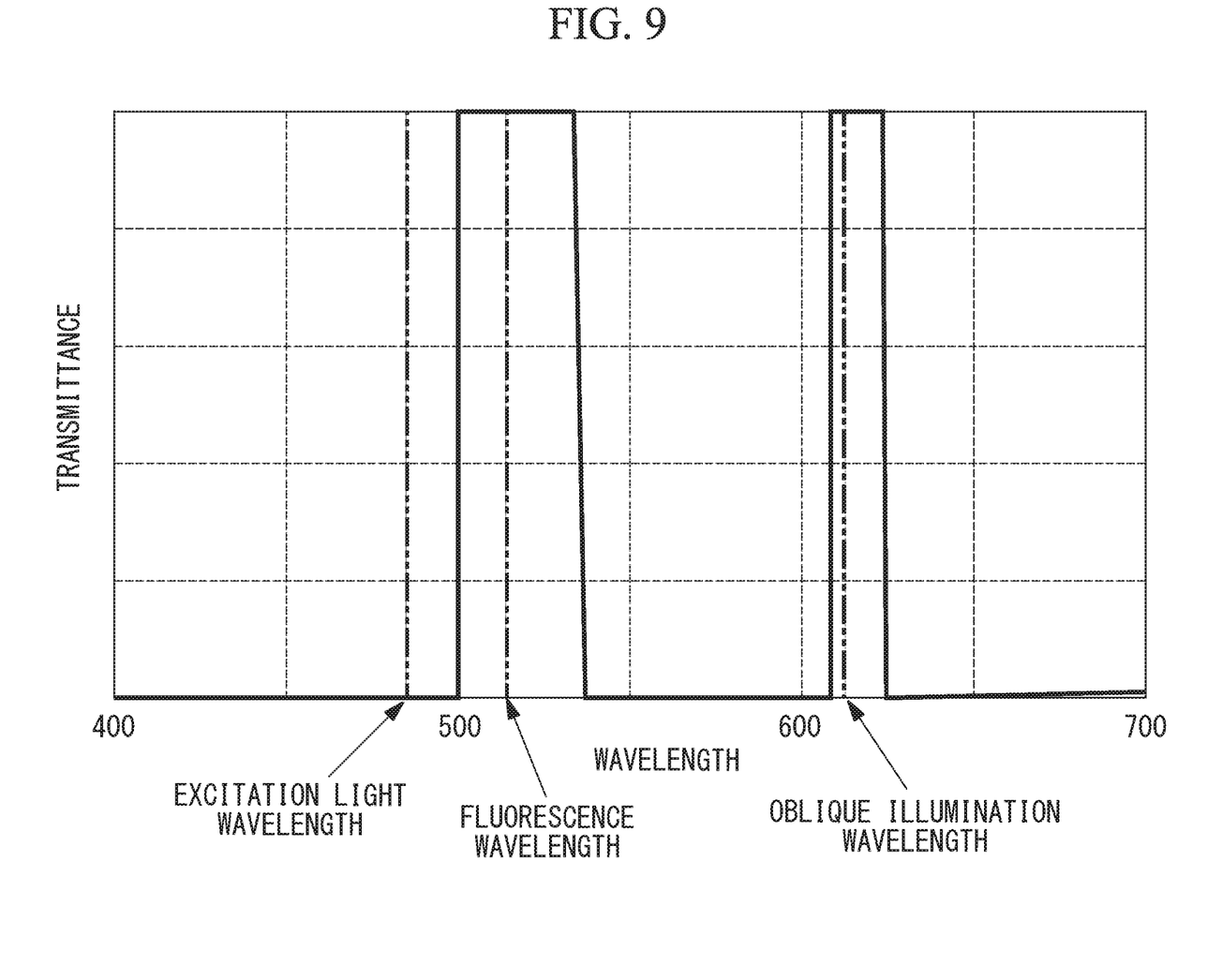
FIG. 9 is a diagram showing a seventh modification of the observation apparatus in FIG. 1, and a graph of wavelength characteristics in the case in which a band-pass filter is employed as a barrier filter.

In this case, for example, as shown in FIG. 9, as the barrier filters 10, band-pass filters possessing wavelength characteristics that allow the illumination light and the fluorescence to pass therethrough and block the excitation light may be employed.

In addition, an image-processing portion (not shown) may be provided, which operates a capturing-light switching portion (not shown) that selectively operates the illumination-light LED light sources 7a and the excitation-light LED light sources 7b and superimposes a transmitted-illumination image and a fluorescence image, which are separately acquired by the image-acquisition device 11. By displaying the combined image that has been superimposed by the image-processing portion on a display portion (not shown) such as a monitor, it is possible to simultaneously observe the shape of the specimen X and the internal structure of the specimen X.

In addition, although a case in which the wavelengths are different for the illumination light and the excitation light has been described, alternatively, the illumination light and the excitation light of the same wavelength may be radiated, and, the barrier filter (detection-light switching portion) 10 that is capable of selectively allowing the illumination light and the fluorescence to pass therethrough may be employed.

It is possible to employ light sources such as laser light sources, instead of the LED light sources 7a and the LED light sources 7b.

Figure 10:
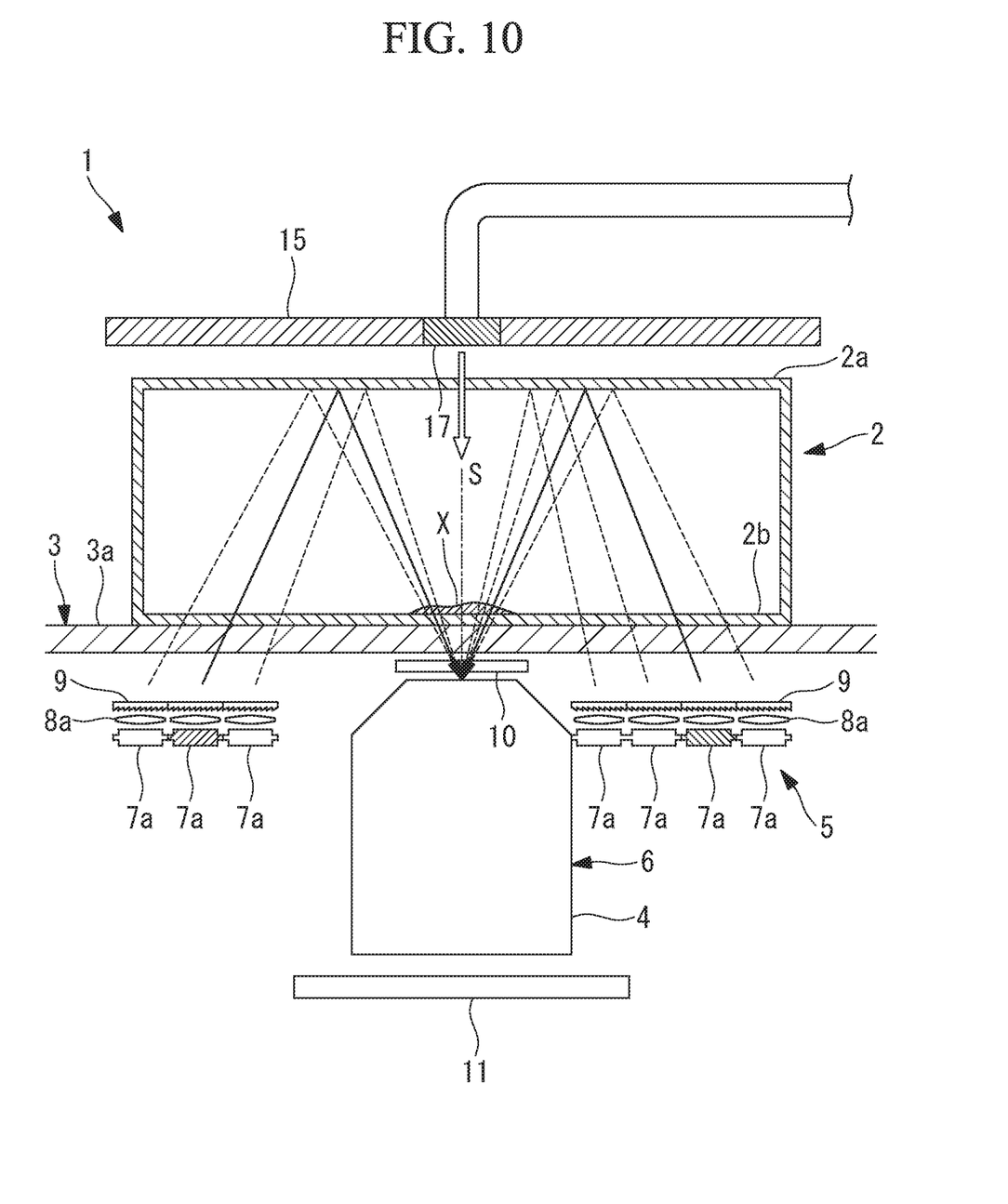
FIG. 10 is a partial longitudinal cross-sectional view showing an eighth modification of the observation apparatus in FIG. 1.

In addition, in this embodiment, the illumination light and the excitation light are both assumed to be emitted upward from the LED light sources 7a and 7b disposed below the stage 3; however, alternatively, as shown in FIG. 10, regarding the excitation light, excitation light that is cut out, by an excitation filter 17, from light that has been guided by a light guide or the like from above the light-blocking member 15 may be radiated toward the specimen X that is positioned below the excitation filter 17. By doing so, it is possible to observe a bright fluorescence image of the specimen X by radiating high-intensity excitation light and by capturing fluorescence that is generated so as to travel in a direction that passes through the specimen X.

As a result, the above-described embodiment also leads to the following aspects.

An aspect of the present invention provides an observation apparatus including: a light-source portion that emits illumination light and excitation light upward from below a specimen; and an image-capturing optical system that captures, below the specimen, transmitted light, which is the illumination light that is emitted from the light-source portion, that is reflected above the specimen, and that has passed through the specimen, and fluorescence that is generated in the specimen that has been irradiated with the excitation light emitted from the light-source portion.

With this aspect, the illumination light emitted from the light-source portion is emitted upward from therebelow the specimen, is subsequently reflected above the specimen, and is made to pass through the specimen downward from thereabove. On the other hand, the excitation light emitted from the light-source portion is radiated toward the specimen and generates fluorescence in the specimen. The transmitted light that has passed through the specimen and the fluorescence that is generated in the specimen are captured by the image-capturing optical system disposed below the specimen. Because the light-source portion and the image-capturing optical system both are disposed below the specimen, it is possible to observe the shape of the imaging subject such as a cell by capturing the transmitted light without causing an increase in the size of the apparatus, and it is possible to observe a fluorescence image of the specimen by capturing the fluorescence.

In the above-described aspect, the image-capturing optical system may be provided with an objective lens that focuses the transmitted light that has passed through the specimen and the fluorescence, and the light-source portion may emit the illumination light and the excitation light from radially outside the objective lens and above the specimen.

By doing so, the illumination light that is emitted from the light-source portion, which is disposed radially outside the objective lens disposed below the specimen, and that is emitted toward above the specimen is reflected above the specimen, enters the specimen from diagonally thereabove with respect to the optical axis of the objective lens, and the transmitted light that has passed through the specimen is captured by the image-capturing optical system. It is possible to form contrast in an image of the specimen by appropriately setting the entry angle with respect to the specimen, and thus, it is possible to acquire an image that is easy to view even with a transparent imaging subject such as a cell.

In the above-described aspect, the image-capturing optical system may be provided with an objective lens that focuses the transmitted light that has passed through the specimen and the fluorescence, and the light-source portion radiates the illumination light from radially outside the objective lens, and radiates the excitation light onto the specimen via the objective lens.

By doing so, it is possible to observe a bright fluorescence image of the specimen by irradiating the specimen with high-intensity excitation light via the objective lens.

In the above-described aspect, the light-source portion may be capable of independently emitting the illumination light from different positions in radial directions of the objective lens.

By doing so, as a result of causing the illumination light to be emitted from a different radial-direction position of the light-source portion, it is possible to change the angle at which the reflected light, which has been reflected by the same reflection surface disposed above the specimen, enters the specimen. In other words, the reflected light of the illumination light that is emitted from a position close to the objective lens in the radial direction enters the specimen at a small angle with respect to the optical axis, whereas the reflected light of the illumination light that is emitted from a position far from the objective lens in the radial direction enters the specimen at a large angle with respect to the optical axis. Accordingly, it is possible to use bright-field illumination in which the illumination irregularity is low in the case in which the entry angle is smaller than the acceptance angle of the objective lens, in addition, it is possible to use dark-field illumination with which fine structure is emphasized in the case in which the entry angle is greater than the acceptance angle of the objective lens, and, furthermore, it is possible to use oblique illumination with which it is possible to three-dimensionally view the specimen in the case in which the entry angle is equivalent to the acceptance angle of the objective lens.

In the above-described aspect, the light-source portion may be capable of simultaneously emitting the illumination light from different positions in circumferential directions of the objective lens.

By doing so, the illumination light is simultaneously emitted from a plurality of positions in the circumferential directions of the objective lens, and it is possible to reduce the illumination irregularity.

In the above-described aspect, the light-source portion may be arrayed in an area surrounding the objective lens and that is provided with a plurality of light sources that are capable of independently being turned on.

By doing so, it is possible to determine the circumferential-direction position of the illumination light and the excitation light by turning on one of the plurality of light sources. Also, by changing the circumferential-direction positions of the light source to be turned on, it is possible to capture images of the specimen that are illuminated from different directions. In particular, in images captured by using oblique illumination, it is possible to capture images in which shadows are formed in different ways.

In the above-described aspect, the light-source portion may be capable of simultaneously emitting the excitation light from different positions in the radial directions of the objective lens.

By doing so, it is possible to observe a bright fluorescence image of the specimen by irradiating the specimen with a greater amount of the excitation light.

In the above-described aspect, the illumination light and the excitation light emitted from the light-source portion may have the same wavelength, and the image-capturing optical system may be provided with a detection-light switching portion that selectively allows the illumination light or the fluorescence to pass therethrough.

By doing so, by switching the detection-light switching portion so as to allow only the illumination light to pass therethrough, it is possible to observe transmitted light of the illumination light in the specimen, and, by switching the detection-light switching portion so as to allow only the fluorescence to pass therethrough, it is possible to observe a fluorescence image of the specimen.

In the above-described aspect, the image-capturing optical system may be provided with a barrier filter that possesses wavelength characteristics that allow the illumination light and the fluorescence to pass therethrough and block the excitation light.

By doing so, as a result of blocking the excitation light, which need not be detected, it is possible to clearly observe the transmitted light of the illumination light in the specimen and a fluorescence image of the specimen.

In the above-described aspect, the light-source portion may be provided with: an optical device that converts the illumination light into substantially parallel light and that focuses the excitation light; and a diffusion plate that diffuses the illumination light and the excitation light.

By doing so, it is possible to perform illumination by efficiently utilizing the illumination light, which is converted, by the optical device and the diffusion plate, to substantially parallel light and that has high robustness without irregularity, and the excitation light without irregularity.

In the above-described aspect, the light-source portion may be provided with a band-pass filter that allows only light in the wavelength bands of the illumination light and the excitation light to pass therethrough.

By doing so, it is possible to use a broadband light source, and it is possible to cut out, by means of the band-pass filter, and utilize only the wavelength bands of the illumination light and the excitation light that are necessary for performing observation.

In the above-described aspect, the specimen may be accommodated in a container formed of an optically transparent material, and the illumination light and/or the excitation light may be reflected by an inner surface of a top plate of the container, which is disposed above the specimen.

By doing so, simply by disposing the container, which has the top plate and accommodates the specimen in the interior thereof, above the light-source portion and the image-capturing optical system, it is possible to cause the illumination light and/or the excitation light emitted from the light-source portion to be reflected by the inner surface of the top plate of the container, and to irradiate the specimen in the container.

In the above-described aspect, the illumination light and/or the excitation light may be reflected by a reflecting member that is disposed above the specimen.

By doing so, in the case in which the specimen accommodated in a container without a top plate, such as a petri dish (no lid), or a cell-culturing pouch is observed, by disposing the reflecting member above the specimen, it is possible to cause the illumination light and/or the excitation light emitted from the light-source portion to be reflected by the reflecting member, and to irradiate the specimen in the container.

In the above-described aspect, the specimen may be immersed in a solution, and the illumination light and/or the excitation light may be reflected by a liquid surface at the top of the solution.

By doing so, in the case in which the specimen that is accommodated in a container without a top plate or a container in which a reflecting member cannot by disposed is observed, it is possible to cause the illumination light and/or the excitation light emitted from the light-source portion to be reflected by the liquid surface of the solution, and to irradiate the specimen in the container.

In the above-described aspect, the image-capturing optical system may be provided with a capturing-light switching portion that switches between capturing of the illumination light and capturing of the fluorescence, and an image-processing portion that superimposes a transmitted-illumination-light image and a fluorescence image that are acquired by the image-capturing optical system may be provided.

By doing so, with the transmitted-illumination-light image and the fluorescence image that are superimposed by the image-processing portion, it is possible to simultaneously observe the shape of the imaging subject, such as a cell, and the internal structure of the cell.

Another aspect of the present invention provides an observation apparatus including: an illumination light-source portion that emits illumination light upward from below a specimen; an excitation light-source portion that emits excitation light from above the specimen; and an image-capturing optical system that captures, below the specimen, transmitted light, which is the illumination light that is emitted from the illumination light-source portion, that is reflected above the specimen, and that has passed through the specimen, and fluorescence that is generated in the specimen that has been irradiated with the excitation light emitted from the excitation light-source portion.

By doing so, by irradiating the specimen with high-intensity excitation light, it is possible to capture, below the specimen, bright, transmitted fluorescence that is emitted toward an opposite side from the illumination direction of the excitation light, and to observe the fluorescence.

The present invention affords an advantage in that it is possible to observe, without causing an increase in the size of the apparatus, a fluorescence image of an imaging subject such as a fluorescent-labeled cell and the shape of the imaging subject.

REFERENCE SIGNS LIST 1 observation apparatus
2 container
2a top plate
4 objective lens
5 light-source portion
6 image-capturing optical system
7a LED light source (light source, illumination light-source portion)
7b LED light source (light source, excitation light-source portion)
7c LED light source (light source)
8a collimating lens (optical device)
8b focusing lens (optical device)
9 diffusion plate
10 barrier filter (detection-light switching portion, band-pass filter)
14 reflecting member
X specimen

The invention claimed is:

1. An observation apparatus comprising:
a light-source that emits illumination light and excitation light upward from below a specimen; and
an image-capturing optical system having an objective lens that focuses, below the specimen, transmitted light, which is the illumination light that is emitted from the light-source, that is reflected above the specimen, and that has passed through the specimen, and fluorescence that is generated in the specimen that has been irradiated with the excitation light emitted from the light-source,
wherein the light-source is disposed radially outside the objective lens.

2. The observation apparatus according to claim 1, wherein the light-source is configured to emit the illumination light from different positions in radial directions of the objective lens.

3. The observation apparatus according to claim 1, wherein the light-source is arranged in an area surrounding the objective lens and comprises a plurality of light sources that are configured to be independently turned on.

4. The observation apparatus according to claim 1, wherein the light-source is configured to simultaneously emit the excitation light from different positions in radial directions of the objective lens.

5. The observation apparatus according to claim 1, wherein:
a wavelength of the illumination light emitted from the light-source is the same as a wavelength of the excitation light emitted from the light source, and
the image-capturing optical system is provided with a detection-light switch that selectively allows the illumination light or the fluorescence to pass therethrough.

6. The observation apparatus according to claim 1, wherein the image-capturing optical system is provided with a barrier filter that possesses wavelength characteristics that allow the illumination light and the fluorescence to pass therethrough and block the excitation light.

7. The observation apparatus according to claim 1, wherein the light-source is provided with:
an optical device that converts the illumination light into substantially parallel light and that focuses the excitation light; and
a diffusion plate that diffuses the illumination light and the excitation light.

8. The observation apparatus according to claim 1, wherein the light-source is provided with a band-pass filter that allows only light in wavelength bands of the illumination light and the excitation light to pass therethrough.

9. The observation apparatus according to claim 1, wherein:
the specimen is accommodated in a container formed of an optically transparent material, and
the illumination light is reflected by an inner surface of a top plate of the container, which is disposed above the specimen.

10. The observation apparatus according to claim 1, wherein the illumination light is reflected by a reflecting member that is disposed above the specimen.

11. The observation apparatus according to claim 1, wherein:
the specimen is immersed in a solution, and the illumination light is reflected by a top liquid surface at the top of the solution.

12. An observation apparatus comprising:
an illumination light-source that emits illumination light upward from below a specimen;
an excitation light-source that emits excitation light toward the specimen; and
an image-capturing optical system that captures, below the specimen, transmitted light, which is the illumination light that is emitted from the illumination light-source, that is reflected above the specimen, and that has passed through the specimen, and fluorescence that is generated in the specimen that has been irradiated with the excitation light emitted from the excitation light-source.

13. The observation apparatus according to claim 12, wherein the excitation light-source emits the excitation light from above the specimen.

14. The observation apparatus according to claim 12, wherein:
the image-capturing optical system is provided with an objective lens that focuses the transmitted light that has passed through the specimen and the fluorescence,
the illumination light-source is disposed radially outside the objective lens and radiates the illumination light from radially outside the objective lens, and
the excitation light-source radiates the excitation light onto the specimen via the objective lens.

15. The observation apparatus according to claim 12, wherein the light-source is arranged in an area surrounding the objective lens and comprises a plurality of light sources that are configured to be independently turned on.

16. The observation apparatus according to claim 12, wherein:
the specimen is accommodated in a container formed of an optically transparent material, and
the illumination light is reflected by an inner surface of a top plate of the container, which is disposed above the specimen.

17. An observation method comprising:
emitting illumination light upward from below a specimen;
reflecting, above the specimen, the emitted illumination light;
causing the reflected illumination light to pass through the specimen;
capturing, below the specimen, transmitted light, which is the illumination light that has passed through the specimen;
emitting excitation light toward the specimen; and
capturing fluorescence generated in the specimen by means of the emitted excitation light.

18. The observation method according to claim 17, further comprising:
superimposing an acquired transmitted-illumination-light image and an acquired fluorescence image.

* * * * *